United States Patent
Höfig

(10) Patent No.: US 10,185,612 B2
(45) Date of Patent: Jan. 22, 2019

(54) ANALYZING THE AVAILABILITY OF A SYSTEM

(71) Applicant: Kai Höfig, München (DE)

(72) Inventor: Kai Höfig, München (DE)

(73) Assignee: Siemens Aktiengesellschaft, München (DE)

(*) Notice: Subject to any disclaimer, the term of this patent is extended or adjusted under 35 U.S.C. 154(b) by 156 days.

(21) Appl. No.: 15/048,644

(22) Filed: Feb. 19, 2016

(65) Prior Publication Data
US 2016/0246661 A1    Aug. 25, 2016

(30) Foreign Application Priority Data

Feb. 20, 2015    (EP) ................................. 15155936

(51) Int. Cl.
| G06F 11/00 | (2006.01) |
| G06F 11/07 | (2006.01) |
| G05B 23/02 | (2006.01) |

(52) U.S. Cl.
CPC ........ *G06F 11/079* (2013.01); *G05B 23/0278* (2013.01); *G06F 11/008* (2013.01); *G06F 11/0736* (2013.01); *G06F 11/0751* (2013.01)

(58) Field of Classification Search
CPC ............... G06Q 30/06; G06Q 30/0609; G06Q 30/0641; G06Q 10/06; G06Q 10/635;
(Continued)

(56) References Cited

U.S. PATENT DOCUMENTS

| 5,014,220 A * | 5/1991 | McMann ............. G06F 11/008 706/45 |
| 5,107,499 A * | 4/1992 | Lirov .................. G06F 11/2257 706/911 |

(Continued)

FOREIGN PATENT DOCUMENTS

| CN | 1629867 A | 6/2005 |
| EP | 2172881 A2 | 4/2010 |

(Continued)

OTHER PUBLICATIONS

Wang, "An Approach of Automatically Performing Fault Tree Analysis and Failure Mode and Effect Techniques to Software Processes", 2010, Nanjing University, p. 1-5.*

(Continued)

*Primary Examiner* — Bryce P Bonzo
*Assistant Examiner* — Jeison C Arcos
(74) *Attorney, Agent, or Firm* — Lempia Summerfield Katz LLC

(57) ABSTRACT

An apparatus and method for analyzing availability of a system including subsystems each having at least one failure mode with a corresponding failure effect on the system are provided. The apparatus includes a degraded mode tree generation unit configured to automatically generate a degraded mode tree. The degraded mode tree includes at least one degraded mode element representing a degraded system state of the system that deviates from a normal operation state of the system based on a predetermined generic system meta model stored in a database including Failure Mode and Effects Analysis elements representing subsystems, failure modes, failure effects, and diagnostic measures. The apparatus also includes a processor configured to evaluate the generated degraded mode tree for calculation of the availability of the system.

17 Claims, 4 Drawing Sheets

(58) Field of Classification Search
CPC ........ G06Q 40/08; G06Q 50/22; G06Q 50/24; G06F 11/3608; G06F 11/008; G06F 11/2257; G06F 10/06
See application file for complete search history.

(56) References Cited

U.S. PATENT DOCUMENTS

| | | | |
|---|---|---|---|
| 5,109,380 A | 4/1992 | Ogino | |
| 6,467,023 B1* | 10/2002 | DeKoning | G06F 11/1092 711/114 |
| 6,499,114 B1* | 12/2002 | Almstead | G05B 19/4184 399/26 |
| 6,671,818 B1* | 12/2003 | Mikurak | G06Q 10/06 714/4.21 |
| 8,156,378 B1* | 4/2012 | Suit | G06F 11/0709 714/26 |
| 8,200,527 B1* | 6/2012 | Thompson | G06Q 10/0639 705/7.38 |
| 8,832,657 B1 | 9/2014 | Cowan et al. | |
| 9,430,315 B2* | 8/2016 | He | G05B 23/0248 |
| 9,727,440 B2* | 8/2017 | Suit | G06F 11/3495 |
| 2001/0002480 A1* | 5/2001 | DeKoning | G06F 3/0626 711/130 |
| 2002/0002448 A1 | 1/2002 | Kampe | |
| 2002/0077800 A1 | 6/2002 | Kampe | |
| 2003/0065986 A1* | 4/2003 | Fraenkel | G06F 11/3006 714/47.2 |
| 2003/0079160 A1* | 4/2003 | McGee | G06F 11/0709 714/39 |
| 2003/0135786 A1* | 7/2003 | Vollmar | G05B 23/0251 714/25 |
| 2003/0187696 A1* | 10/2003 | Bonissone | G06Q 40/08 705/4 |
| 2004/0044499 A1* | 3/2004 | House | G01R 31/343 702/181 |
| 2004/0181685 A1* | 9/2004 | Marwaha | H04L 41/0686 726/22 |
| 2004/0225381 A1* | 11/2004 | Ritz | G06F 11/0709 700/26 |
| 2004/0236820 A1* | 11/2004 | Flocken | G06F 11/0709 709/200 |
| 2005/0060323 A1* | 3/2005 | Leung | G05B 23/0275 |
| 2005/0114226 A1* | 5/2005 | Tripp | G06Q 30/06 705/26.35 |
| 2005/0149570 A1* | 7/2005 | Sasaki | G06Q 10/06 |
| 2006/0259271 A1* | 11/2006 | House | G05B 23/0248 702/181 |
| 2007/0050178 A1* | 3/2007 | Linzey | G06Q 10/04 703/2 |
| 2008/0040174 A1* | 2/2008 | Murthy | G06Q 30/06 709/224 |
| 2008/0059840 A1 | 3/2008 | Takezawa et al. | |
| 2009/0083576 A1* | 3/2009 | Vlassova | G06F 17/5009 714/26 |
| 2009/0096405 A1* | 4/2009 | Flickinger | G01R 31/343 318/565 |
| 2009/0299713 A1* | 12/2009 | Miller | G05B 17/02 703/8 |
| 2010/0318856 A1* | 12/2010 | Yoshida | G05B 23/024 714/47.1 |
| 2010/0322089 A1* | 12/2010 | Raja | H04L 41/5009 370/252 |
| 2011/0137703 A1* | 6/2011 | Dugan | G06Q 10/0635 705/7.28 |
| 2011/0145657 A1* | 6/2011 | Bishop | G06F 11/3495 714/47.1 |
| 2012/0113815 A1* | 5/2012 | Zhang | H04L 41/12 370/242 |
| 2012/0166623 A1* | 6/2012 | Suit | G06F 11/3006 709/224 |
| 2012/0166874 A1* | 6/2012 | Bernardez | H04M 1/24 714/26 |
| 2012/0167084 A1* | 6/2012 | Suit | G06F 11/3495 718/1 |
| 2012/0167094 A1* | 6/2012 | Suit | G06F 9/5077 718/100 |
| 2012/0317058 A1* | 12/2012 | Abhulimen | G06N 99/005 706/2 |
| 2013/0018692 A1 | 1/2013 | Guo et al. | |
| 2013/0262064 A1* | 10/2013 | Mazzaro | G05B 23/0251 703/7 |
| 2014/0129000 A1* | 5/2014 | Block | G05B 9/02 700/79 |
| 2014/0129187 A1* | 5/2014 | Mazzaro | G06F 17/5009 703/2 |
| 2014/0257828 A1* | 9/2014 | Thornley | G06F 11/00 705/2 |
| 2014/0337277 A1* | 11/2014 | Asenjo | G06F 17/30592 707/603 |
| 2014/0365662 A1* | 12/2014 | Dave | G06F 9/45533 709/226 |
| 2015/0142402 A1* | 5/2015 | Ramesh | G06F 17/5009 703/7 |
| 2015/0193290 A1* | 7/2015 | He | G05B 23/0248 714/37 |
| 2016/0103559 A1* | 4/2016 | Maheshwari | G06F 17/30548 715/738 |
| 2016/0103838 A1* | 4/2016 | Sainani | G06F 3/0488 707/725 |

FOREIGN PATENT DOCUMENTS

| | | |
|---|---|---|
| JP | H01250016 A | 10/1989 |
| JP | 2005182465 A | 7/2005 |
| JP | 2006127464 A | 5/2006 |
| JP | 2012098820 A | 5/2012 |

OTHER PUBLICATIONS

Wang, "An Automatic Failure Mode and Effect Analysis Technique for Processes Defined in the Little-Jil Process Definition Language", 2010, Nanjing University, p. 1-6.*

Ruijters, "Fault tree analysis: A survey of the state-of-the-art in modeling, analysis and tools", Dec. 2014, Elsevier, Computer Science review 15-16, pp. 1-34 (Year: 2014).*

Kabit, "Fuzzy temporal fault tree analysis of dynamic systems", Nov. 2015, Elsevier, International Journal of Approximate Reasoning 77, pp. 1-18 (Year: 2015).*

Papadopoulos, "Model-based system monitoring and diagnosis of failures using statecharts and fault trees", 2003, Elsevier—Science Direct, pp. 1-17 (Year: 2003).*

Bluvband, "Expanded FMEA (EFMEA)" 2004, p. 1-6 (Year: 2004).*

European Search Report for related European Application No. 15155936.6 dated Aug. 5, 2015.

Japanese Grant Decision for Japanese Application No. 2016029940, grant date May 2, 2017.

Japanese Office Action for Japanese Application No. 2016029940, dated Jan. 10, 2017.

Chinese Office Action for Chinese Application No. 201610093396.8, dated Jun. 4, 2018.

* cited by examiner

ANALYZING THE AVAILABILITY OF A SYSTEM

This application claims the benefit of EP 15155936.6, filed on Feb. 20, 2015, which is hereby incorporated by reference in its entirety.

BACKGROUND

Safety critical technical systems may include a plurality of subsystems each including components. These components may include hardware and/or software components. Safety critical systems may include complex systems with distributed subsystems and/or system components. Some subsystems may be formed by embedded systems. For such a complex system, the consequences of potential failures on the functionality of the whole system are to be examined.

A Failure Mode and Effects Analysis (FMEA) may be used to examine the consequences of potential failures on the functionality of an investigated system. Different variations of FMEA analysis are currently used in most technical domains to analyze safety critical systems. Since safety critical systems normally include a high technical complexity, automations and tool support have a long history in research and industry. Whereas compact embedded systems may be analyzed using conventional FMEA in a manually maintained table, complex systems easily result in unmanageable long tables, especially if larger development teams for developing the specific system are involved. In conventional failure mode and effects analysis, a measure is typically described for documentary reasons textually and refers to the detection of a specific failure mode and its effect on the system. Such a conventional failure mode and effects analysis method has several drawbacks. The described measures refer to the detection of failure mode instead of describing a global system state of the investigated system. Sometimes it may be sufficient to document that a certain failure mode is sufficiently covered by a specific diagnostic measure (e.g., to document that all single point failures have been covered). However, for a system with high availability requirements (e.g., for a safety critical system), it is important to know how often a diagnostic measure brings the system in a degraded mode where the system is in a safe state but is not able to fulfill all its functions.

Further, textually described measures do not support the analysis of different degraded modes of the system. Since many different measures may exist to prevent single point failures, a fraction of the measures may result in the same degraded state, whereas a different fraction may result in another degraded state of the system. Textual descriptions do not provide a consistent analysis to distinguish multiple degraded modes for performing a complex FMEA analysis of a complex technical system. Typically, FMEA tables (e.g., spreadsheet tables) for complex systems are long and contain many different diagnostic measures. For example, for a component of an investigated system such as a capacitor in an electronic circuit, a failure mode such as "short circuit" may have the effect that "an amplification factor exceeds limitation." Such an effect may be, for example, detected by a diagnostic measure "pulsed test will detect this failure." This is a textual description of a measure to be taken, but there is no description of the state of the system that the system will be if this measure is active. Even an additional text field does not allow to analyze the availability of the system since it may occur multiple times spread over the entire FMEA analysis.

For the diagnostic measure "pulsed test will detect this failure" of a conventional FMEA analysis, no description may be given how the reaction of the system is if this measure is activated. It may be that the measure for the "short circuit" failure mode of the component capacitor results in a system state where no function is available until the investigated system is reset and the capacitor has been exchanged. Another failure mode such as "open circuit on pin2" on another component such as a transistor may also be detected by the diagnostic measure "pulsed test will detect this failure" but will result in a different degraded state of the investigated system (e.g., all functions of the system are still available but with a reduced speed). Again, an additional textual description does not enable the analysis of different modes that reduce availability if the investigated system is comparatively complex.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and apparatus that allow analysis of the availability of a complex system including a plurality of subsystems and/or components are provided.

One or more of the present embodiments provide, according to a first aspect, a method for analyzing the availability of a system. The method includes automatically generating a degraded mode tree (DMT) containing at least one degraded mode element representing a degraded system state of the system, which deviates from a normal operation state of the system based on a predetermined generic system meta model stored in a database including Failure Mode and Effects Analysis (FMEA) elements representing subsystems, failure modes, failure effects and diagnostic measures. The method also includes evaluating the generated degraded mode tree (DMT) to calculate the availability of the system.

The generation and evaluation of the DMT may be performed automatically, allowing to analyze a complex system including a plurality of subsystems and/or components during runtime of the system and/or during a planning stage of the system.

Since the calculation of the availability is performed automatically, the method according to the first aspect is by far less error-prone than a conventional FMEA analysis.

In a possible embodiment of the method according to the first aspect, each failure mode element of the meta model has an associated failure effect element holding information about the failure effect of the failure mode instance on the investigated system.

In a possible embodiment of the method according to the first aspect, each failure effect element of the meta model has an associated measure element that represents a diagnostic measure adapted to protect the system from the corresponding failure effect to occur.

In a further possible embodiment of the method according to the first aspect, each measure element of the meta model is associated to a degraded mode element holding information about the degraded mode of the system.

In a further possible embodiment of the method according to the first aspect, for each degraded mode element, a global degraded mode gate element representing a disjunction of all possible failure effect and diagnostic measure combinations for the respective degraded mode of the system is provided.

In a still further possible embodiment of the method according to the first aspect, for each measure element that is associated to a degraded mode element, a measure gate element is provided representing a pair of a diagnostic measure and a failure effect associated to a failure mode of the system and indicating a contribution of the respective failure mode and measure combination to the respective degraded mode of the system.

In a possible embodiment of the method according to the first aspect, the global degraded mode element is formed by an OR gate.

In a further possible embodiment of the method according to the first aspect, the measure gate element is formed by an AND gate.

In a further possible embodiment of the method according to the first aspect, each FMEA element of the system meta model includes a unique identifier.

One or more of the present embodiments further provide, according to a second aspect, an apparatus for analyzing the availability of a system.

According to the second aspect, an apparatus for analyzing the availability of a system includes subsystems each having at least one failure mode with a corresponding failure effect on the system. The apparatus includes a DMT generation unit adapted to automatically generate a DMT containing at least one degraded mode element representing a degraded system state of the system, which deviates from a normal operation state of the system based on a predetermined generic system meta model stored in a database including FMEA elements representing subsystems, failure modes, failure effects, and diagnostic measures, and a processing unit (e.g., a processor) adapted to evaluate the generated DMT for calculation of the availability of the system.

One or more of the present embodiments further provide, according to a third aspect, a system including a plurality of subsystems each having at least one failure mode with a corresponding failure effect on the system. The system includes an apparatus according to the second aspect configured to analyze the availability of the system during runtime of the system.

In a possible embodiment of the system according to the third aspect, the system is a safety critical system including safety critical subsystems and/or system components.

In a possible embodiment of the system according to the third aspect, each subsystem of the system includes system components including hardware components and/or software components.

One or more of the present embodiments further provide, according to a fourth aspect, a system planning tool adapted to perform the method according to the first aspect during a planning stage of the system.

One or more of the present embodiments further provide, according to a fifth aspect, a computer program product (e.g., a non-transitory computer-readable storage medium) storing executable instructions adapted to perform the method according to the first aspect.

DETAILED DESCRIPTION

Figure 1:
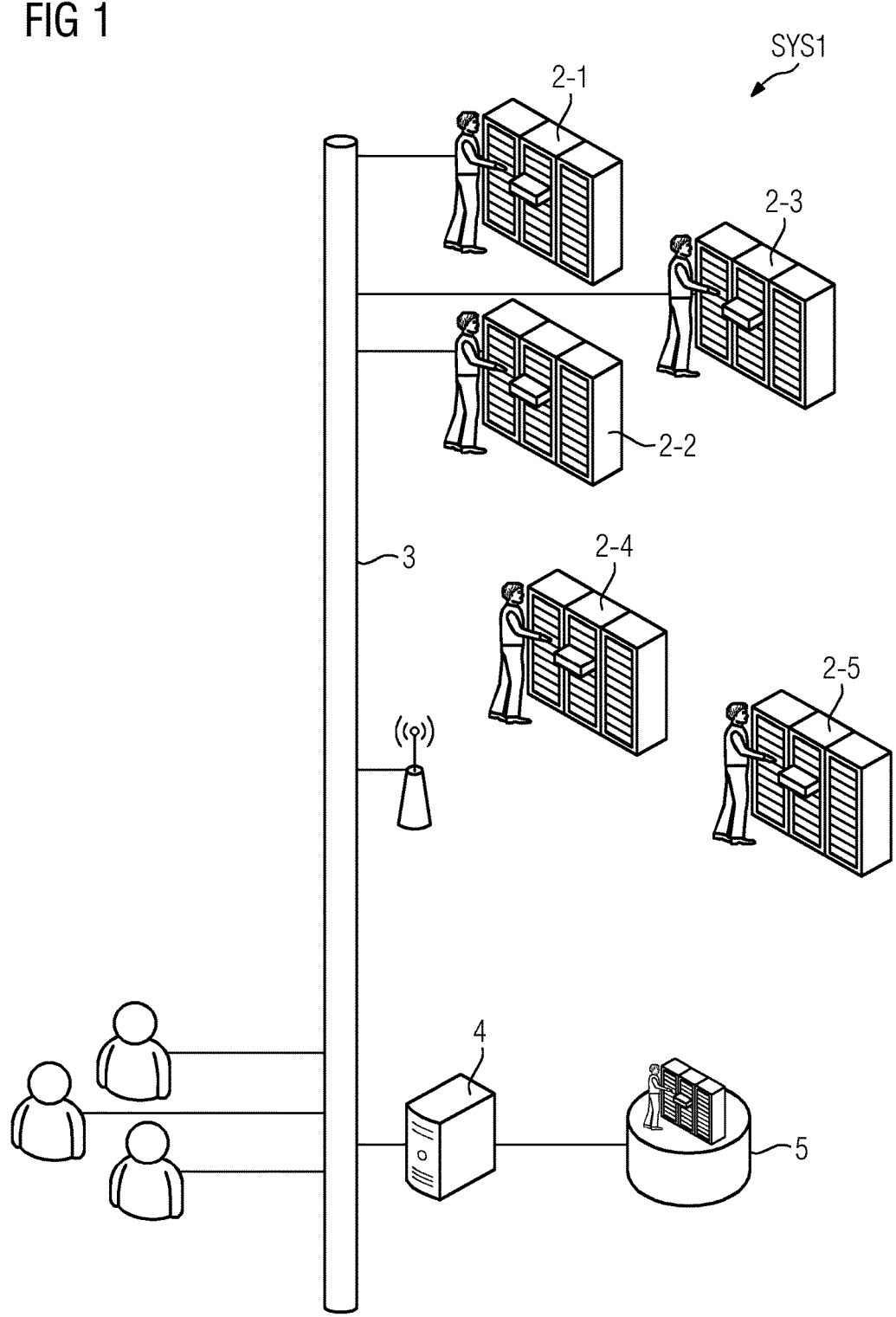
FIG. 1 shows an exemplary embodiment of a safety critical system having an availability that may be analyzed by using a method and apparatus according to an embodiment.

As shown in FIG. 1, a complex technical system SYS 1 may include a plurality of different subsystems 2-$i$. Each subsystem 2-$i$ of the plurality of different subsystems 2-I may include software and/or hardware components communicating with each other via a local network. In the exemplary system 1, as illustrated in FIG. 1, the different subsystems 2-$i$ may be linked to a global communication bus 3 of the system 1, allowing the subsystems 2-$i$ of the system 1 to communicate with each other. In the exemplary system 1 illustrated in FIG. 1, subsystems 2-1, 2-2, 2-3 are connected via wired links to the system communication bus 3, whereas the subsystems 2-4, 2-5 are connected to the communication bus 3 via a wireless link. In the exemplary embodiment illustrated in FIG. 1, the system 1 may include a server 4 also connected to the communication bus 3 and having access to a FMEA database 5, as shown in FIG. 1. Users such as engineers or system designers are also linked directly to the communication bus 3 of the system via a user terminal, as illustrated in FIG. 1. Each subsystem 2-$i$ may include subsystems including software and hardware components. Each subsystem may have at least one failure mode with a corresponding failure effect on the system 1. The server 4 of the system 1 may include an analyzing apparatus to analyze the availability of the system 1 during runtime of the system or during a planning or building stage of the system 1.

Figure 2:
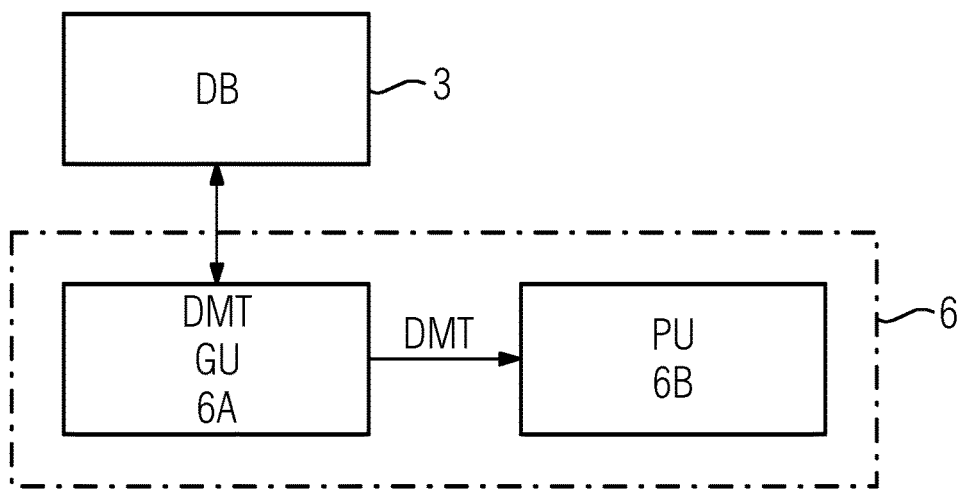
FIG. 2 shows a block diagram of an exemplary embodiment of an apparatus for analyzing the availability of a system such as illustrated in FIG. 1.

FIG. 2 illustrates in a block diagram a possible exemplary embodiment of an analyzing apparatus 6 adapted to analyze the availability of a technical system 1 such as illustrated in FIG. 1. The analyzing apparatus 6 may be implemented on a server 4 of the investigated system 1. As shown in FIG. 2, the analyzing apparatus 6 has access to a database such as the FMEA database 5 illustrated in FIG. 1. The apparatus 6 includes a degraded mode tree (DMT) generation unit 6A adapted to automatically generate a DMT containing at least one degraded mode element representing a degraded system state of the system 1, which deviates from a normal operation state of the system 1 based on a predetermined generic system meta model stored in a database including FMEA elements representing subsystems, failure modes, failure effects and diagnostic measures. The degraded mode tree generation unit 6A automatically generates the DMT and supplies the generated DMT to a processing unit 6B of the apparatus 6, as illustrated in FIG. 2, to calculate the availability of the investigated system 1. In a possible embodiment, the processing unit 6B includes at least one processor configured to process the received DMT for calculating the current availability of the system 1 during runtime of the system 1. In an alternative embodiment, the processing unit 6B is configured to calculate the availability of the investigated system 1 during a planning stage of the system or during maintenance or repair of the system 1. The calculated availability of the system 1 may be output by the apparatus 6 via a user interface to a system engineer of the system 1.

In a further possible embodiment, the calculated availability is output by the processing unit 6B of the apparatus 6 via an interface to a remote control unit of the investigated system 1. In a possible embodiment, the control unit of the system 1 receives the calculated availability of the system 1 and controls at least one system component C and/or subsystem 2-*i* of the system 1 in response to the calculated system availability.

Figure 3:
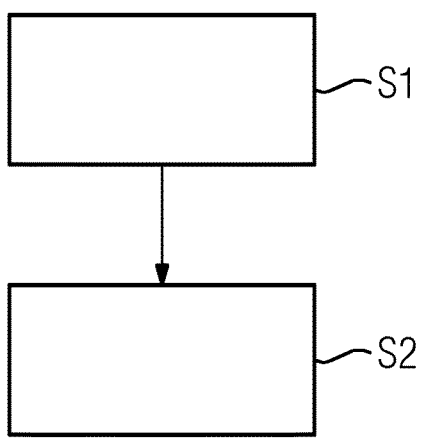
FIG. 3 shows a flowchart for illustrating an exemplary embodiment of a method for analyzing the availability of a system such as illustrated in FIG. 1.
Figure 4:
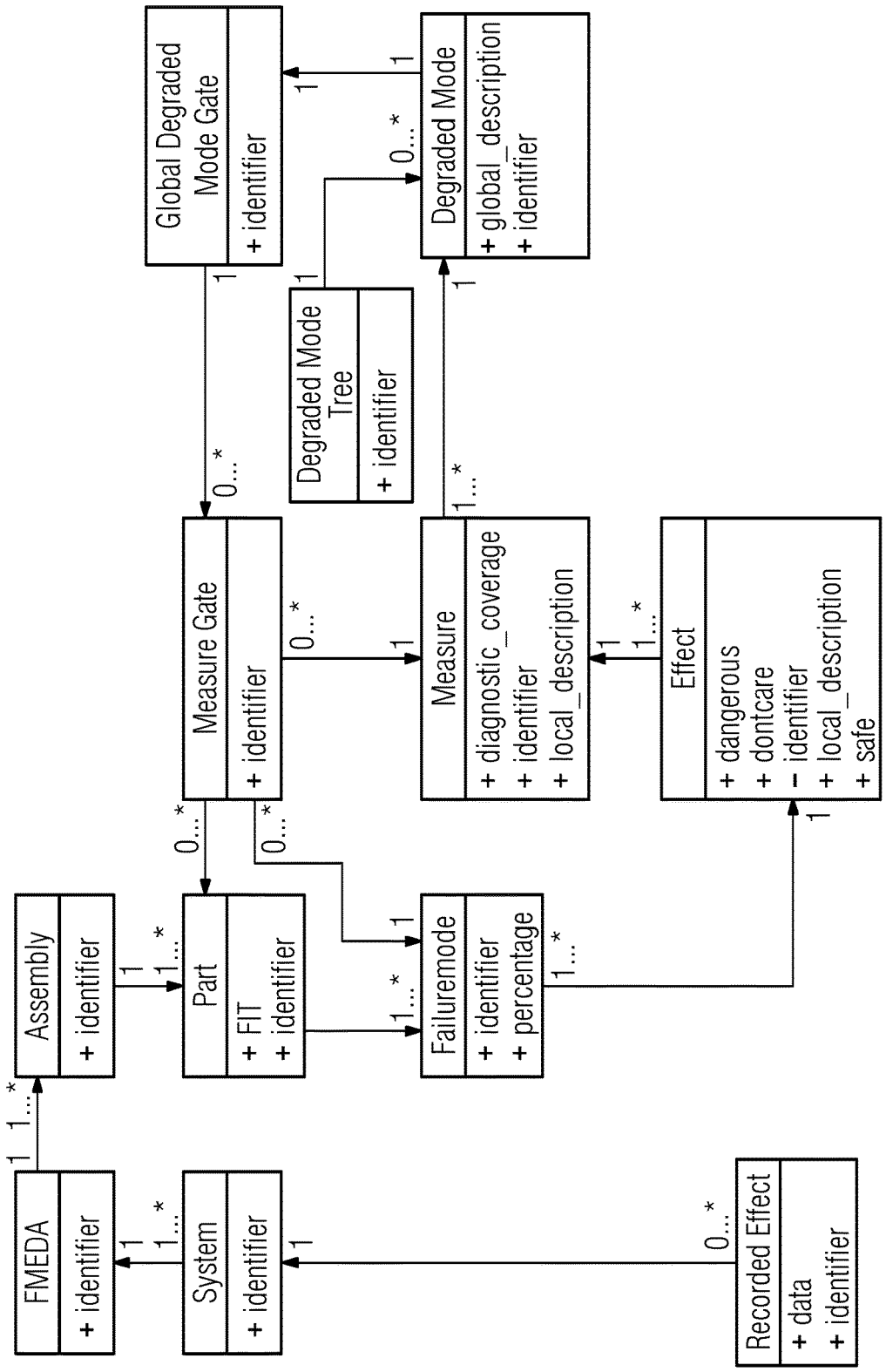
FIG. 4 shows a diagram for illustrating a generic system meta model that may be used by the method and apparatus according to an embodiment for analyzing the availability of a technical system such as illustrated in FIG. 1.

FIG. 3 shows a flowchart of an exemplary embodiment of a method for analyzing the availability of a system 1, as illustrated in FIG. 1. The illustrated method may be executed by an analyzing apparatus 6, such as illustrated in FIG. 2, for example, on a server 4 forming part of the investigated system 1, as shown in FIG. 1. As shown in FIG. 3, in act S1, a DMT containing at least one degraded mode element representing a degraded system state of the system 1 that deviates from a normal operation state of the system 1 is generated automatically based on a predetermined generic system meta model stored in a database (e.g., the FMEA database 5 shown in FIG. 1, including FMEA elements representing subsystems, failure modes, failure effects and diagnostic measures of the system). FIG. 4 shows a diagram for illustrating a possible embodiment of a system meta model used by the method and apparatus according to one or more of the present embodiments to automatically generate a DMT.

In act S2 of the method, a DMT is evaluated automatically to calculate the availability of the investigated system 1. The evaluation may be performed during runtime of the system 1 or during a planning stage of the system 1.

FIG. 4 shows a diagram for illustrating a generic system meta model that may be used for the analyzing method according to the first aspect. The meta model provides the relevant elements and the relations for an availability-centered analysis of the system 1. The meta model is capable to reflect classic FMEA elements but extends FMEA analysis by using further relations. In this way, an analysis for global degraded modes is enabled, enabling an availability-centered FMEA analysis. As shown in FIG. 4, the investigated system 1 may include multiple assemblies or subsystems. Each assembly is a set of analyzable elements of the system 1 that build a logic unit. Each element of an assembly is a part or component C such as an electronic device or electronic element. Each part or system component has an associated set of failure modes. A failure mode may describe a specific kind of failure that a part or component may have. Since a part has a quantified behavior to fail, which may be referred to as failure in time (FIT), a failure mode has a percentage to assign a percentage part of the quantified failure behavior of the part to the specific failure mode. As shown in FIG. 4, each failure mode element of the meta model has an associated failure effect element holding information about the failure effect of the failure mode instance on the system. The effect may be classified and quantified in a category. For example, each effect may be categorized into the categories safe, dangerous, and dontcare to mark an effect as not harmful (e.g., safe), with no effects on the outcome of the analysis (e.g., dontcare), or as harmful (e.g., dangerous). An effect has an associated measure. A measure protects the system from the effect to occur (e.g., if an effect is detected during the runtime of the analyzed system, and the system 1 is set into a shut-down state (e.g., safe state) to prevent the respective effect). Since mechanisms detecting failure mode instances during the runtime of a system are mostly not 100% effective, the effect has an associated effectiveness (e.g., a quantified percentage value (diagnostic coverage)). To allow the clustering of effects programmatically (e.g., within a database like MySQL or ACCESS), all elements include identifiers that allow to explicitly identify the elements.

As shown in FIG. 4, each failure effect element of the illustrated meta model has an associated measure element that represents a diagnostic measure adapted to protect the system from the corresponding failure effect to occur. Each measure element of the meta model is associated to a degraded mode element holding information about the degraded mode of the system. For each measure element that is associated to a degraded mode element, a measure gate element is provided representing a pair of a diagnostic measure and a failure effect associated to a failure mode of the system and indicating a contribution of the respective failure mode and measure combination to the respective degraded mode of the system. As also illustrated in FIG. 4, each failure mode and effects analysis element of the system meta model includes a unique identifier. In a possible embodiment, a global degraded mode element, as illustrated in FIG. 4, may be formed by an OR gate. Further, the measure gate element illustrated in FIG. 4 may be formed by an AND gate.

The diagnostic measure typically changes the operation mode of the investigated system 1 with which the system is currently working or operating. Each diagnostic measure has an associated degraded mode. The degraded mode element contains a global description holding the information about the degraded mode (e.g., in which state the system is if this degraded mode is active). To allow a centered analysis, all degraded modes are related to a DMT element, as shown in FIG. 4.

With the elements "degraded mode tree", "measure gate", and "global degraded mode gate", the meta model provides a data structure for quantitative or qualitative analysis of the system 1. A FMEA analysis may be performed using the required FMEA elements (e.g., FMEDA, assembly, part, failure mode, measure, effect) within a data structure that allows relations with a database like MySQL or ACCESS. During the FMEA development process, degraded modes may be related to the measures. With this information, the DMT is automatically generated.

For each degraded mode element, a new element may be created (e.g., the "global degraded mode gate"). This element represents the disjunction of all possible effect and measure combinations for a specific degraded mode. For example, if a Boolean tree is selected as the desired data structure for analysis, this element is represented by an OR gate in the tree. Each "global degraded mode gate" element gets related multiple "measure gate" elements.

Each "measure gate" element of the meta model illustrated in FIG. 4 represents one pair of an effect and measure, one for each measure that is related to the "degraded mode" element that belongs to the "global degraded mode" element. For example, if a Boolean tree is selected as the desired data structure for analysis, this element is represented as an AND gate in the tree and is related as an input to the OR gate represented by the "global degraded mode gate" element in the Boolean tree. The "measure gate" element represents the contribution of a specific failure mode and measure combination to a degraded mode. To represent this, the data structure is utilized to identify and relate the corresponding "failure mode" element, "part" element and "measure" element to the "measure gate" element of the data model.

The FMEA analysis covers analytically all system instances (or products) in the real world. To allow diagnosis, effects of failure modes of the real world technical system 1 are recorded. Each subsystem or subsystem component may have various failure modes, and therefore, recordable effects may be observed during runtime of the system. These recorded effects are associated to the effects documented in the FMEA to monitor the current or actual failure rates during runtime of the system.

The direction of the associations illustrated in FIG. 4 document a correlation. The direction of an arrow is only conceptual, the implementation of the meta model (e.g., in a database structure) works bidirectional. The quantifications connected to the associations are also exemplary and may change for different domains or different types of FMEA. For example, the association between the elements recorded event and system documents that a recorded event belongs to a system and that every recorded effect belongs to exactly one system but that every system may have zero or any arbitrary number of recorded events.

Figure 5:
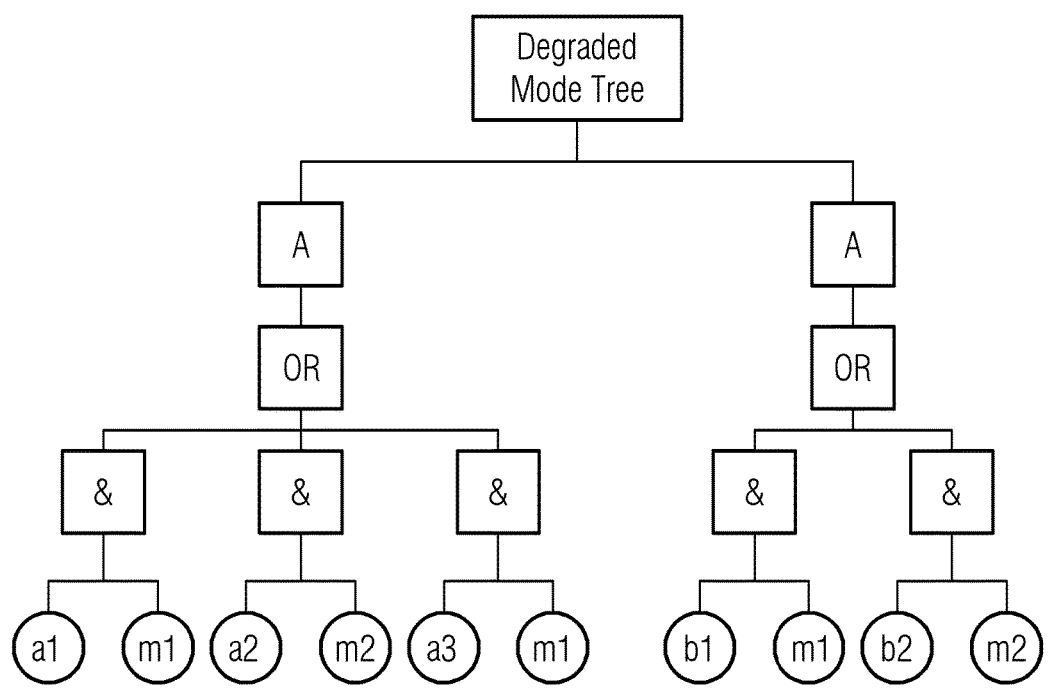
FIG. 5 shows a diagram for illustrating an exemplary degraded mode tree that may be generated and evaluated by the method and apparatus.

To illustrate the use of the generic system meta model, as shown in FIG. 4, and the generation of a DMT by the method and apparatus according to one or more of the present embodiments, an abstract example for an FMEA and a resulting DMT is illustrated in the below Table and in FIG. 5. The Table shows elements of a FMEA. Each row of the Table documents a failure mode of a specific part, its effect, and a corresponding diagnostic measure. Additionally, degraded modes have been inserted. FIG. 5 shows a corresponding generated DMT using a Boolean notation. The DMT has two associated "degraded mode" elements A and B from the FMEA data structure, as shown in the above Table.

| Part | Failure Mode | Effect | Measure | Degraded Mode |
|------|--------------|--------|---------|---------------|
| 1 | 1 | a1 | m1 | A |
| 1 | 2 | a2 | m2 | A |
| 1 | 3 | b1 | m1 | B |
| 2 | 4 | b2 | m2 | B |
| 2 | 5 | a3 | m1 | A |

For each degraded mode, one "global degraded mode gate" represented by an element labeled with OR is associated to the degraded mode. This element has associated "measure gate" elements labeled with an &-symbol, one for each effect and its corresponding measure. The meta model and the data structure allow a global analysis for the effects a1, a2, a3, b1, and b2 including the impact of the measures m1 and m2. For a quantitative analysis, the failure rates or failure in time (FIT) from the parts, the fraction of the failure rate that is related to the failure mode (e.g., percentage), and the effectiveness of the measure (e.g., diagnostic coverage) may be used to quantify each "measure gate" (&), for example, as follows:

FIT(&)=FIT(failure mode)*Percentage(effect)*Percentage(measure).

The quantification for a "global degraded mode gate" would then be:

FIT(OR)=FIT(&1)+ . . . +FIT(&n).

Using the meta model, as illustrated in FIG. 4, drawbacks of a conventional FMEA analysis may be overcome. The DMT, such as illustrated in FIG. 5, contains all different degraded modes. Each degraded mode describes a mode that deviates from the full functionality of the system 1. The top element of the tree, as shown in FIG. 5, allows the analysis of the unavailability of the full functionality of the investigated system 1. A single degraded mode element may be used to analyze each degraded mode separately.

The FMEA analysis of the system may be stored within a data structure such as a MySQL or ACCESS database. The roles that analyze the system 1 (e.g., the team of analysts, designers and engineers) may use the availability-centered FMEA analysis according to one or more of the present embodiments to analyze the impact of effects. Filed data is associated to certain effects using a wired or wireless connection to the system implementation (e.g., using event logging mechanisms). Since all elements of the meta model use a unique identifier, relations may be used in a database system to solve the afore-mentioned problems of a conventional FMEA analysis. If an effect requires investigation, a DMT may be automatically generated and checked against requirements or field data.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for analyzing availability of a system, the method comprising:
   automatically generating a degraded mode tree comprising at least one degraded mode element, wherein the at least one degraded mode element represents a degraded system state of the system that deviates from a normal system state of the system based on a predetermined generic system meta model stored in a database, wherein the meta model comprises Failure Mode and Effects Analysis elements representing subsystems, failure modes, failure effects and diagnostic measures; and
   calculating, by a processor, the availability of the system, the calculating comprising evaluating the generated degraded mode tree,
   wherein each failure effect element of the meta model has an associated measure element that represents a diagnostic measure adapted to protect the system from the corresponding failure effect to occur and an effectiveness of the diagnostic measure in preventing the failure effect from occurring.

2. The method of claim 1, wherein each failure mode element of the meta model has an associated failure effect element holding information about the failure effect of the failure mode instance on the system.

3. The method of claim 1, wherein each measure element of the meta model is associated to a degraded mode element holding information about the degraded mode of the system.

4. The method of claim 1, wherein for each degraded mode element, a global degraded mode gate element representing a disjunction of all possible failure effect and diagnostic measure combinations for the respective degraded mode of the system is provided.

5. The method of claim 4, wherein the global degraded mode element is formed by an OR gate.

6. The method of claim 1, wherein for each measure element that is associated to a degraded mode element, a measure gate element representing a pair of a diagnostic measure and a failure effect associated to a failure mode of the system and indicating a contribution of the respective failure mode and measure combination to the respective degraded mode of the system is provided.

7. The method of claim 6, wherein the measure gate element is formed by an AND gate.

8. The method of claim 1, wherein each Failure Mode and Effects Analysis element of the system meta model comprises a unique identifier.

9. An apparatus for analyzing availability of a system comprising subsystems each having at least one failure mode with a corresponding failure effect on the system, the apparatus comprising:
   a degraded mode tree generator configured to automatically generate a degraded mode tree containing at least one degraded mode element, wherein the at least one degraded mode element represents a degraded system state of the system that deviates from a normal operation state of the system based on a predetermined generic system meta model stored in a database, and wherein the meta model comprises Failure Mode and Effects Analysis elements representing subsystems, failure modes, failure effects, and diagnostic measures; and
   a processor configured to evaluate the generated degraded mode tree for calculation of the availability of the system,
   wherein each failure effect element of the meta model has an associated measure element that represents a diagnostic measure adapted to protect the system from the corresponding failure effect to occur and an associated effectiveness of the diagnostic measure in preventing the failure effect from occurring.

10. A system comprising:
   a plurality of subsystems, each subsystem of the plurality of subsystems comprising at least one failure mode with a corresponding failure effect on the system; and
   an apparatus configured to analyze availability of the system during runtime of the system, the apparatus comprising:
      a degraded mode tree generator configured to automatically generate a degraded mode tree containing at least one degraded mode element, wherein the at least one degraded mode element represents a degraded system state of the system that deviates from a normal operation state of the system based on a predetermined generic system meta model stored in a database, and wherein the meta model comprises Failure Mode and Effects Analysis elements representing subsystems, failure modes, failure effects, and diagnostic measures; and
      a processor configured to evaluate the generated degraded mode tree for calculation of the availability of the system,
   wherein each failure effect element of the meta model has an associated measure element that represents a diagnostic measure adapted to protect the system from the corresponding failure effect to occur and an associated effectiveness of the diagnostic measure in preventing the failure effect from occurring.

11. The system of claim 10, wherein the system is a safety critical system.

12. The system of claim 10, wherein each subsystem of the plurality of subsystems comprises system components including hardware components, software components, or a combination thereof.

13. In a non-transitory computer-readable storage medium storing instructions executable by one or more processors to analyze availability of a system, the instructions comprising:
   automatically generating a degraded mode tree comprising at least one degraded mode element, wherein the at least one degraded mode element represents a degraded system state of the system that deviates from a normal system state of the system based on a predetermined generic system meta model stored in a database, wherein the meta model comprises Failure Mode and Effects Analysis elements representing subsystems, failure modes, failure effects and diagnostic measures; and
   calculating the availability of the system, the calculating comprising evaluating the generated degraded mode tree,
   wherein each failure effect element of the meta model has an associated measure element that represents a diagnostic measure adapted to protect the system from the corresponding failure effect to occur and an associated effectiveness of the diagnostic measure in preventing the failure effect from occurring.

14. The non-transitory computer-readable storage medium of claim 13, wherein the non-transitory computer-readable storage medium is a computer program product, the computer program product being a system planning tool configured to analyze the availability of the system during a planning stage of the system.

15. The non-transitory computer-readable storage medium of claim 13, wherein each failure mode element of the meta model has an associated failure effect element holding information about the failure effect of the failure mode instance on the system.

16. The non-transitory computer-readable storage medium of claim 13, wherein each measure element of the meta model is associated to a degraded mode element holding information about the degraded mode of the system.

17. The method of claim 1, wherein the failure effect element is detected during runtime of the system,
   and wherein the diagnostic measure is adapted to prevent the failure effect element during runtime of the system.

* * * * *